United States Patent [19]

Lange

[11] Patent Number: 4,792,910

[45] Date of Patent: Dec. 20, 1988

[54] ELECTRONIC METHOD AND STORAGE SYSTEM FOR STORING SETTING VALUES FOR SETTING DEVICES IN PRINTING MACHINES

[75] Inventor: Peter Lange, Mauer, Fed. Rep. of Germany

[73] Assignee: Heidelberger Druckmaschinen Ag, Heidelberg, Fed. Rep. of Germany

[21] Appl. No.: 727,530

[22] Filed: Apr. 26, 1985

[30] Foreign Application Priority Data

Apr. 26, 1984 [DE] Fed. Rep. of Germany ....... 3415500
Mar. 16, 1985 [DE] Fed. Rep. of Germany ....... 3509633

[51] Int. Cl.$^4$ .............................................. G06K 3/00
[52] U.S. Cl. ................... 364/519; 235/432; 235/454; 235/375
[58] Field of Search ............... 225/454, 456, 432, 437, 225/375; 364/464, 466, 900, 519, 523; 250/206, 568; 340/825.82

[56] References Cited

U.S. PATENT DOCUMENTS

| | | | |
|---|---|---|---|
| 4,301,507 | 11/1981 | Soderberg et al. | 364/464 |
| 4,310,754 | 1/1982 | Check, Jr. | 235/454 |
| 4,345,311 | 8/1982 | Fielden | 364/483 |
| 4,347,506 | 8/1982 | Duwel et al. | 340/679 |
| 4,449,206 | 5/1984 | Tokitsu et al. | 365/229 |
| 4,471,440 | 9/1984 | Check et al. | 364/466 |
| 4,524,426 | 6/1985 | Eckert et al. | 364/900 |
| 4,578,758 | 3/1986 | Muller | 364/466 |
| 4,596,984 | 6/1986 | Egami | 340/825.54 |

Primary Examiner—P. S. Lall
Assistant Examiner—Thomas G. Black
Attorney, Agent, or Firm—Herbert L. Lerner; Laurence A. Greenberg

[57] ABSTRACT

A storage system for the storage of setting values for adjusting devices on printing machines including a portable memory unit for the exchange of data with a device for communication, preferably disposed on the printing machine. A housing of the memory unit contains electrically operated, solid-state storage elements that are coupled to an electronic control unit for making logic decisions. The memory unit contains at least one data input in the form of at least one contactlessly working sensor and a data output in the form of at least one contactlessly scannable output element, both optically coupled to corresponding optical elements of the device for communication through viewing windows during data exchange. For the display and input of storage information and values, a display and a manual input device are located on the memory housing. The memory unit is supplied with power without metallic coupling by an external power supply which supplies a power supply internal to the memory unit with the operating energy required by means of inductive capacitive or sound generated externally to the memory unit. This assures a largely interference-proof and substantially maintenance-free data exchange.

19 Claims, 6 Drawing Sheets

ELECTRONIC METHOD AND STORAGE SYSTEM FOR STORING SETTING VALUES FOR SETTING DEVICES IN PRINTING MACHINES

Method and storage system to store setting values for adjusting devices on printing machines, in particular process, program, and command sequences as well as general data and values, using a memory unit with storage elements, preferably electronically operated solid-state storage elements, and at least one device for communication with the memory unit and for processing the stored data.

Known for DE-OS No. 31 11 177 is a control unit for printing machines in which presetting values for the inking device are stored. The punched tapes, write/read memories, ferrite core memories and magnetic bubble memories used for this purpose involve, however, passive storage elements throughout which, in addition, are extremely expensive and not at all or only partly transportable. These storage elements are usually supplied with power and controlled via a multiplicity of lines through contacts. Due to its complex control logic, the use of a magnetic bubble memory requires a very current demanding feeding of its control, for instance.

Memories of the kind mentioned at the outset require bidirectional data traffic between the memory and the printing machine so that electrical signals must be directed to the printing machine for readout from the memory, and electrical signals must be sent to the memory when writing into it.

Also known from the above-mentioned publication are memories not requiring the feeding in of electrical signals. They involve magnetic discs or magnetic tapes, but their disadvantages are, among other things, that they are relatively trouble-prone, particularly also in consequence to their mechanical contact with the recording and playback head and, in addition, that they require a mechanical drive, notwithstanding their susceptibility to malfunctions due to dust, dirt, oil, and moisture. In a printing shop, particular attention must be paid to the latter because the constant relative humidity required there could be the cause of trouble when using magnetic discs or tapes.

Contrary to the passive storage elements described at the outset, the invention is based on the task of providing an active, intelligent storage medium of compact design which works essentially interferenceproof and maintenancefree without the requirement of mechanically rubbing or touching elements for data transmission and power supply, and is universally applicable.

According to the invention, this task is solved by a method characterized in that the memory unit is portable and the supply of power to the memory as well as the transmission of data take place contactlessly and without coupling, bidirectional data traffic being possible at least in half-duplex mode, and in that an intelligent facility for preparation, storage, and management of the stored data is provided with error detection, error correction and a plausibility check taking place in the data preparation stage.

According to claim 3, the hardware-directed solution of the task consists therein that the memory unit is designed as a portable data memory and equipped with at least one data input in the form of at least one sensor operating contactlessly, and with at least one data output in the form of at least one output element which can be scanned contactlessly; and therein that there is provided in the memory unit a power supply unit which can be fed externally and contactlessly; and therein that an electronic control unit (electronic computer system) which makes logic decisions is coupled to the storage elements, the device for communication with the memory unit is preferably disposed on the printing machine.

The invention offers the advantage that for both data transmission and power supply no electrically conducting connections are required between printing machine and memory. It is well known that such electrical connections are extremely trouble-prone due to dirt, corrosion, oxidation, bonding, melting, etc. This is of particular importance in connection with etc. This is of particular importance in connection with printing machines since a particularly aggressive and hazardous ambient atmosphere can develop from the paper dust, alcohol additives in the wetting agent, in the wiping water, in the printing ink solvent, etc., or from their evaporation. This makes the use of contacts in control and data transmission lines more and more questionable because due to the possibility of forming "spark gaps" the risk of explosion of hazardous air/dust mixtures, or their ignition, cannot be excluded entirely.

The transmission of data to the printing machine is considerably simplified as the electronic control unit according to the invention is an integral part of the memory and can make logic decisions itself. In the simplest case of serial data transmission, only a single sensor and a single output element are needed in the memory unit because of the intelligent, independent data management, and yet the data can still be read correctly out of a multiplicity of storage elements or stored correctly into a multiplicity of storage elements. A maximum degree of transmission reliability is achieved by a check of the value ranges, by a plausibility test, error detection and error correction.

Although preference is given to serial data transmission, parallel data transmission is also taken into account. It may then be expedient to transmit at least eight bits each of the data in parallel. In this case it may be advantageous to provide a corresponding number of sensors and output elements.

In summary, the invention thus combines the advantage of the solid-state storage elements—having no moving parts—with the advantage of conventional magnetic tape cassettes—having no need for externally accessible electrical signal lines on the memory—with absolutely no mechanical friction or touching contact between storage medium and recording unit or between memory power supply and the corresponding energy store.

To keep the memory design as compact and its production cost as low as possible, one and the same transmission system is used for power supply and/or data input and/or data output, thereby maximizing the degree to which the existing electronic components are utilized.

To expand the data content, the memory and/or the device for communication with the memory is equipped, in further development of the inventive idea, with a display in which the stored data can be displayed in numeric and/or graphic form by automatic or manual triggering. This display enables the printing machine operator to read important information directly, such as the printing order number, or that the memory content is erased, thus being available to record any printing program.

One advantageous embodiment of the invention is characterized therein that the memory and/or the device for communication with the memory is equipped with a manual input unit. This would enable the printing machine operator to erase the memory content as needed, or to mark it invalid or even given an already stored repeat program for the printing machine a special identification which was originally not stored automatically by the printing machine itself.

For the manual input unit to be able to meet even the most severe conditions occurring in practice, it is equipped with a membrane keyboard, the advantage of which is, besides a particularly low structural height, that especially the memory housing can be sealed completely dust and liquid tight against its surrounding, thus making it relatively insusceptible to trouble.

For universal applicability, at least the data input (sensor) of the memory is designed so that it can be used as a bar code reader and that the electronic control unit can be provided with an associated evaluation program; alternatively, the memory's data input and data output together can be designed as bar code reader.

To ensure the best possible utilization of the electronic components in order to keep production costs low, the data input (sensor) and/or the data output (output element) and/or the power supply input are identical, with the stored data being modulated on the energy carrier. This makes either separate hardware exclusively for data transmission or separate hardware exclusively for power supply unnecessary.

One advantageous embodiment of the invention provides for the sensor to be a light-sensitive element. Since a photodiode or phototransistor is preferably employed, the transmitting element on the device for communication with the memory in the printing machine, which element interacts with the sensor, is then designed as a light-emitting element, preferably as an LED.

In one embodiment of the invention, the output element is a light-emitting element or an element scannable by light. Especially in the first case this may involve an LED, in the second case a liquid crystal element which, depending on the output data, does or does not reflect incident light, for instance. The device for communication with the memory—preferably mounted on the printing machine—would then have to be equipped with a light source and a photoreceiver receiving the reflected light to scan such a liquid crystal element.

A further development of the inventive concept is that the sensor and/or the output element can be actuated or scanned inductively or capacitively. These elements may be, for example, induction coils or metallic, conducting surfaces interacting with an induction coil or opposing electrode in the device for communication with the memory—preferably mounted on the printing machine.

According to another embodiment of the invention it is advantageous for the sensor to be a microphone and the output element a sound transmitter so that data can be transmitted purely acoustically. A frequency in the ultrasonic range is suitable for this purpose because sound in this range is not perceived by the human ear.

To widen the radius of action and provide universal applicability, a preferred embodiment of the invention provides energy radiation to generate the operating power for the memory unit, the power supply unit being coupled to a radiation-sensitive element which can be irradiated by a radiation source outside the memory. This arrangement makes it possible to make the memory independent of the line current and supply it with electric energy by the conversion of light, at least during the time of a data exchange when it is communicating with the device for communication with the memory (then preferably in the printing machine). The light may be generated by a suitably positioned light source, such as inside the printing machine. The advantage of this arrangement is that, by suitably keeping the memory separated from the device for communication with the memory, i.e. outside the printing machine, this light-sensitive element can continue to furnish electric energy which can then serve, for instance, to feed a storage battery, thereby prolonging the life of a stored charge.

Instead of light, thermal radiation may also be used to supply the energy, it being possible in this case to transmit the thermal energy also by heat conduction.

An embodiment of the invention relating thereto consists therein that the operating power for the memory is of an inductive and/or capacitive nature, the power supply unit having an induction coil and/or capacitor plates by means of which the operating power can be supplied inductively or capacitively from outside the memory housing. It has proven to be expedient to dispose the induction coil or capacitor plates near the inside of a memory housing outside wall so as to provide the best possible interaction with an induction coil or further capacitor plates disposed outside the memory and forming part of an external power supply unit. The latter is expediently mounted in the device for communication with the memory.

Especially when using an induction coil, a considerable amount of power can be transmitted contactlessly to the memory, and the a-c voltage furnished by the induction coil disposed inside the memory can be brought within wide limits to its optimum desired for the respective application by suitably selecting the number of turns. This can be particularly beneficial when storage elements are used which require a high voltage of e.g. 25 V for erasing, as is necessary, at least to date, for electrically erasable memories (EEPROMs).

For the previously mentioned case in which the memory sensor is a microphone and the output element a sound transmitter, it is also advantageous to provide sound energy not only for data transmission, but also for the generation of the operating power for the memory, the power supply unit containing an element which converts sound energy into electric energy and to which sound energy can be supplied by a sound transmitter disposed outside the memory.

The electric operating power required in particular to read and write the memory content may be generated by providing inside the memory housing an energy store to power the memory elements for data retention, said energy store being preferably a battery. One embodiment of the invention may provide for a duplicating device for multiplying the stored data, in which multiplier the data inputs (sensor and data outputs (output elements) of two memories are opposite each other for data transmission.

It is accordingly an object of the invention to provide a method of storing setting value data for adjustment devices on printing machines, in particular of process, program and command data flows as well as of general data and values, using a memory unit with storage elements, preferably electrically operated, solid-state storage elements, and providing at least one device for communication with the memory unit and for processing the stored information, and wherein the memory unit is portable and the power supply of the memory unit as well as the data traffic are contactless without galvanic, metallic or d-c coupling. Bidirectional data traffic is thereby possible at least in semiduplex form, and in intelligent preparation, storage and management of the stored information data is provided with error detection, error correction and plausibility check taking place in the data preparation.

In another embodiment one and the same transmission system is used for the power supply and/or the data input and/or the data output.

In a further embodiment the storage of setting values for adjusting devices on printing machines, in particular of process, program and command data-flows as well as of general data and values, a memory unit is used with storage elements, preferably electrically operated, solid-state elements, and with at least one device for communication with the memory unit and for processing the stored information, and wherein the memory unit is constructed as a portable data store and equipped with at least one data input in the form of at least one contactlessly working sensor and has at least one data output in the form of at least one contactlessly scannable output element and wherein a power supply unit is externally feedable contactlessly disposed in the memory unit; and wherein an electronic control unit (electronic computer system) makes logic decisions and is coupled to the storage elements. The device for communication with the memory unit is preferably disposed on the printing machine.

In an added embodiment, a storage system is provided, wherein the memory unit and/or the device for communication with the memory unit is equipped with a display on which stored information can be displayed numerically and/or graphically, and is triggered automatically or manually.

In an additional embodiment, a storage system is provided wherein the memory unit and/or the device for communication with the memory unit is equipped with a manual input device.

In again another embodiment, a storage system is provided wherein the manual input device is equipped with a membrane keyboard.

In again a further embodiment, a storage system is provided wherein the data input and/or the data output and/or the input of the power supply unit are identical, and wherein the stored information is modulated with data superimposed on the energy carrier.

In again an added embodiment, a storage system is provided wherein the sensor is a light-sensitive element.

In again an additional embodiment, a storage system is provided, wherein the sensor and/or the output element can be driven or scanned inductively or capacitively.

In yet another embodiment, a storage system is provided, wherein the sensor is a microphone and the output element a sound transmitter.

In yet a further embodiment, a storage system is provided, wherein energy radiation is provided to generate the operating energy for the memory unit and the power supply is coupled to a radiation-sensitive element which can be irradiated by a radiation source located outside the memory unit.

In yet an added embodiment, a storage system is provided, wherein the generation of the operating energy for the memory unit is of inductive and/or capacitive nature, and the power supply contains an induction coil and/or capacitor plates, by means of which the operating energy can be supplied inductively or capacitively from the outside of the memory housing.

In yet an additional embodiment, a storage system is provided, wherein the induction coil or capacitor plate is disposed near the inside of an external wall of the memory housing.

In still another embodiment, a storage system is provided, wherein sound energy is provided for the generation of the operating energy for the memory unit and the power supply contains an element which converts sound energy into electrical energy, to which element sound energy can be supplied from a sound transmitter located outside the memory unit.

In still a further embodiment, a storage system is provided, wherein there is disposed in the memory housing an energy store to supply the storage elements with energy for information retention, and wherein said energy store preferably is a storage battery.

In a concomitant embodiment, a storage system is provided, wherein a duplicating device for the reproduction of the stored information is provided in which the data inputs and data outputs (output elements) of two memory units are opposite each other for data information transfer.

Additional features and advantages of the invention become evident from the following description of an embodiment example depicted in the drawings, the various features being realizable, singly or in any combination, within the scope of the invention.

In the drawings,

FIG. 2, is a perspective view of the data store according to FIG. 1, FIG. 3, is a flow diagram with a timing plan of the master program of the electronic control unit with selective command selection.

Figure 1:
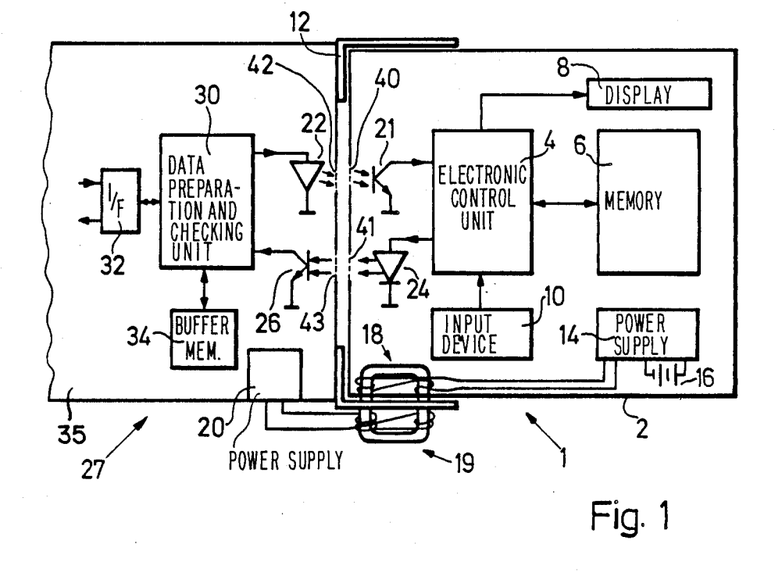
FIG. 1 is a schematic view of a memory and of the device for communication with the memory, directly interacting with the former and disposed on the printing machine.

In FIG. 1, the various electronic components of a memory unit 1 are mounted in a housing 2 indicated only in outline. The memory unit 1 contains an electronic control unit 4, designed as an electronic computer system and capable of making logic decisions intelligently and independently. The electronic control unit 4 is connected to a memory 6 formed by semiconductor circuits, to a display 8 designed as a liquid crystal display, and to an input device 10. The latter is equipped with a membrane keyboard 52 disposed on the outside of the largely hermetically sealed memory housing 2.

The display 8 is disposed in the immediate vicinity of a transparent section of the housing 2 of the memory unit 1 and can be triggered automatically or manually. The stored information can be made visible to the user selectively in numeric and/or graphic form in a display field 50 of the display 8, FIG. 2 even if the memory unit 1 is installed in a seating device 12 which is only indicated in the drawing and disposed on the device for communication 27 with the memory unit 1. The device for communication 27 with the memory unit 1, in turn, can be fixed preferably in the printing machine in a manner neither detailed nor described.

It goes without saying that the device for communication 27 with the memory unit 1 can also be mounted to any other machine, e.g. a machine tool.

The memory unit 1 contains additionally a power supply 14, coupled to an internal energy store 16 preferably in the form of a dry-cell battery. In addition, the power supply 14 communicates with an induction coil 18 with a U-shaped iron core. The induction coil 18 is located in the particular area of the memory housing 2 which is disposed in the seating device 12.

When the memory unit 1 is inserted into the seating device 12, the induction coil 18 is coupled magnetically to an induction coil 19 which also has a U-shaped core and forms part of an external power supply 20. Alternating current is fed to this induction coil 19 by the power supply 20 via inputs 44 and 45 (FIG. 2) so that the power supply 14 is also supplied with a-c power by the induction coil 18. The power supply 14, receives the d-c energy from the energy required to operate the printing machine. As long as a-c is supplied to the power supply 14, the battery 16 remains turned off.

In other embodiments of the invention, a small storage battery or a capacitor is used instead of the dry-cell battery 16, in which case the power supply 14 is designed so that it charges the storage battery or capacitor when supplied with alternating current. In a manner known to those skilled in the art and, therefore, not detailed and described, the power supply 14 is connected to the other electronic components of the memory unit 1.

The memory unit 1, or expressed more precisely, the memory housing 2 has a data input 21 in the form of a sensor working without making contact and a data output 24 in the form of an output element scannable without contact. Used here as data input 21 is a light receiver designed as a phototransistor which is in active optical connection with a light transmitter 22 provided at the device for communication 27 with the memory unit 1. The output of the light receiver 21 is applied to an input of the electronic control unit 4.

The data output 24 of the memory unit 1 or the memory housing 2 is designed as a light-emitting diode 24 and connected to an output of the electronic control unit 4. The light-emitting diode 24 is optically coupled to a light receiver 26 of the device for communication 27 with the memory unit 1. This optical coupling is made possible by transparent areas designed as viewing windows 40 to 43 and disposed both in the memory housing 2 and in the housing 35 of the device for communication 27. The said optical elements 21 and 24 are mounted close to the inside wall of the memory housing 2 and the corresponding optical elements 22 and 26 in the immediate vicinity of the inside wall of the housing 35.

In one embodiment of the invention one and the same transmission system is used for energy supply and/or data input and/or data output. In this case, the data input (sensor 21) and/or the data output (output element 24) and/or the input (42, 43) of the power supply 14 are identical. For data exchange, the stored information is modulated on the respective energy carrier, e.g. amplitude modulation, frequency modulation or the like.

Depending on requirements it is also possible to use the memory unit 1 as a conductorless bar code reader independent of the supply line. This requires that at least the data input (sensor 21) of the memory unit 1 be designed as a bar code reader known per se.

Prerequisite therefor is that the electronic control unit 4 was provided with the necessary bar code interpretation program.

The light transmitter 22 and the light receiver 26 in the communication device 27—and therefore in the printing machine—with a data preparation and checking circuit 30 for the data read-out from the memory unit 1 on the one hand and on the other hand for the data fed via an interface circuit 32 to the data preparation and checking circuit 30 by a known, and therefore not detailed and shown, control unit.

Part of data preparation and checking circuit 30 is also a buffer memory 34 in which the data, transmitted serially at a high rate of speed, are buffered to facilitate checking them.

Conversely, namely when storing data, the data are checked by the electronic control unit 4 of the memory unit 1. The automatic data management by means of the electronic control unit 4 includes, among other things, checking the value ranges of the data transmitted, a plausibility test, and error detection and error correction.

Figure 2:
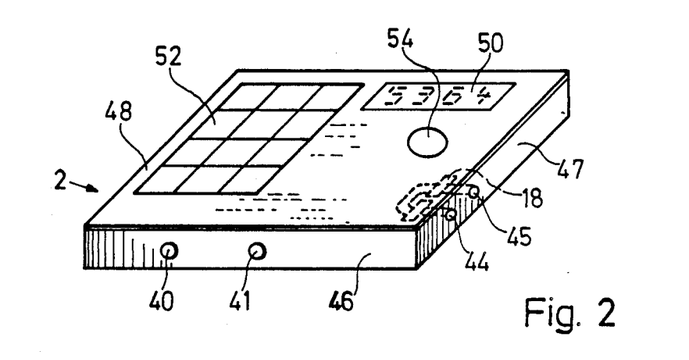

FIG. 2 is a perspective view of the memory unit 1. Directly behind the viewing windows 40 and 41, on a narrow side 46 of the memory housing 2, are the light receiver 21 and the light transmitter 24. The induction coil 18 is also disposed close to a narrow side 47 which runs transversely to a narrow side 46. The display field 50 of the display 8 and the membrane keyboard 52 of the input device 10 are disposed on the top 48 of the memory housing 2. Assuming the memory housing 2 has the preferable dimensions of a conventional magnetic tape cassette, namely 65×45×9 mm, already existing mechanical parts of the seating device 12 on the printing machines can be retained if they conventionally use a magnetic tape cassette as the storage medium.

The memory 6 of the memory unit 1 contains semiconductor storage elements for read-write operation (RAM), produced in CMOS technology and therefore require only extremely little current, a few microamperes at most. In the embodiment example, the memory 6 has a capacity of 256K bytes. The intelligence of the electronic control unit 4 also sees to it that the information received from the sensor 21 is stored in the storage elements of the memory 6 in exactly prescribed sequence.

The electronic control unit 4 also makes it possible to make certain given information visible graphically or alphanumerically on the display 8 by means of the input device 10. For this purpose, the embodiment example provides that the printing order number, for instance, can be displayed, whose setting values are stored in the memory 1 along with the date when these data were established. If the memory unit 1 contains no valid or no stored data at all, this is also made visible by an appropriate display in the display field 50.

The data stored in the memory 6 of the memory unit 1 may come from a printing machine on which a printing order is run for the first time so that the setting values found can be stored in the memory unit 1 for the quick execution of a repeat order. The stored information may also stem from another device, e.g. a printing plate measuring instrument, so that the printing machine can already be preset very accurately by means of these data. Corrections of the setting values possibly made by the printing machine operator are also stored in the memory unit 1 after the correction has been made.

The printing machine operator can also cause these values to be displayed in the display 8. In addition, he can also put in, for control purposes, a machine number (number of the printing machine used) which can be interrogated. By putting in a code number, which requires depressing several keys of the membrane keyboard 52 in predetermined order, corresponding commands can be entered, such as the erasure of the content of the memory unit 1.

The battery 16 is accessible after removal of a cover 54. So that it can be replaced without data losses, a capacitor which maintains the voltage for several more minutes after the removal of the battery 16 is advantageously shunted across it. If EEPROMs or non-volatile RAMs are used as storage elements, a battery is no longer needed.

The function and operating mode of the memory system according to the invention—the program flow in particular—are described in greater detail in the following.

It is assumed that the data are transmitted serially and, for reasons of transmission reliability, an error-tolerant code (Hamming) should be used if at all possible. This has the advantage that transmission errors can not only be found but also be eliminated, at least partly.

It makes sense, but is not a requirement, that the data be transmitted blockwise with an added-up check sum. It is advantageous for the electronic control unit 4 (electronic computer system) to perform a plausibility check of the data to be stored so that errors not due to the data transmission, such as values outside of a specified range, can be detected in time, thus preventing resulting errors.

A detected but uncorrected error requires a repetition of the data transmission. Lacking this data transmission repetition, the transmission is stopped after a predetermined time span and the previous status, i.e. the initial status of the memory system prior to the data transmission, is reestablished or retained.

Figure 3:
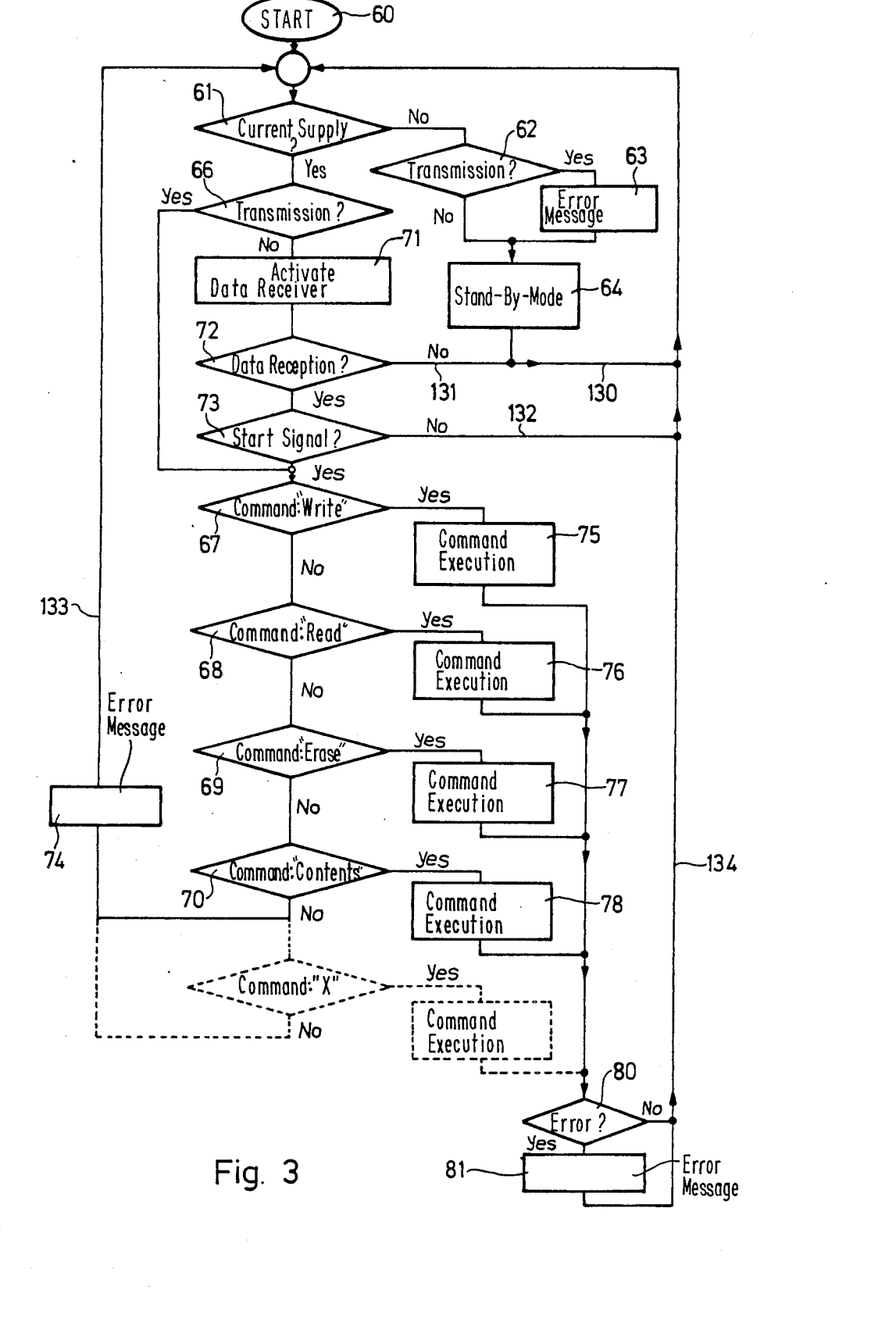

The flow chart of FIG. 3 shows a flow diagram of the master program of the electronic control unit 4 with a selective choice of commands.

The operating power required for working with the memory unit 1 is ensured, for example, by installing the primary battery 16 or storage battery in the memory housing 2. The starting dialog 60 causes the memory unit 1 to be initiated, for instance all programmable hardware elements are set or the content is erased completely if the memory 1 already had a content. The program step 61 inquires whether the power supply is active. In the negative, the electronic control unit 4 inquires in the next program step 62 whether a transmission of data is already underway. In the affirmative, an error message 63 is sent to indicate that the power supply is inactive, e.g. defective. This could have been caused by the removal of the memory unit 1 from its seat 12 on the device for communication 27 with the memory unit 1 during the transmission. This will interrupt the power supply of if the memory 1 has no energy store 16 of its own and must be supplied extraneously by the external power supply 20.

Both an affirmation and negation of the program inquiry 62 lead to the initiation of a stand-by mode 64, i.e. all not absolutely necessary power consumers are shut off and the clock frequency of the electronic control unit 4 is reduced. Only the possibility to turn on the bar code reader remains active, provided the memory 1 is designed as such. The power supply step 61 is then repeatedly interrogated via a program loop 130. As soon as its activation is confirmed, a check as to whether a transmission of data is already underway is made in the next program step 66.

If the answer to query 66 whether a data transmission is already underway is no, the stand-by mode is cancelled in a continuous program step 71 and the memory 1 or its storage elements readied by activating the light receiver 21. If in a subsequent program interrogation 72 no data are received, the interrogation is continued via a program loop 131 until data are received in program step 72. To obtain a defined starting point for a data transmission, an agreed-upon start symbol must now be received yet, such as via a fixed bit pattern (program step 73). If this is not the case, the program keeps running on a program loop 132. If a start symbol has been received o.k. in step 73, the start information is interpreted further by the electronic control unit 4 on the basis of its bit pattern in such a manner that branch-offs are made from several selected possible commands (steps 67-70). The flow chart of FIG. 3 indicates, by way of example, the command codes "write", "read", "erase", and "execute content" under the respective reference numbers 67 to 70.

If no such command code is received, the program returns to its initial starting position in a long program loop 133, giving an error message 74 indicating, for instance, that a command has not been recognized. But if one of the above-mentioned command codes 67 to 70 is registered, the execution of the respective command is initiated via the respective program steps 75 through 78. It is noted in this initiation that a transmission of data is underway and which command has been selected. A subsequent error inquiry 80 is to determine whether an error has occurred during the execution of the command. The program will return to its initial starting position via a program loop 134 if the answer to this question is either no or yes—in the latter case an error message 81 about trouble in executing the command is sent. From this initial starting position the queries 61 and 66 are run again, normally both with with an affirmative answer. Then branching into the already selected command execution 75 to 78 takes place. Another alternative to the above-described automatic data exchange between printing machine and memory system is manual command initiation by the operator via the foil keyboard 52 or the bar code reader.

Figure 4:
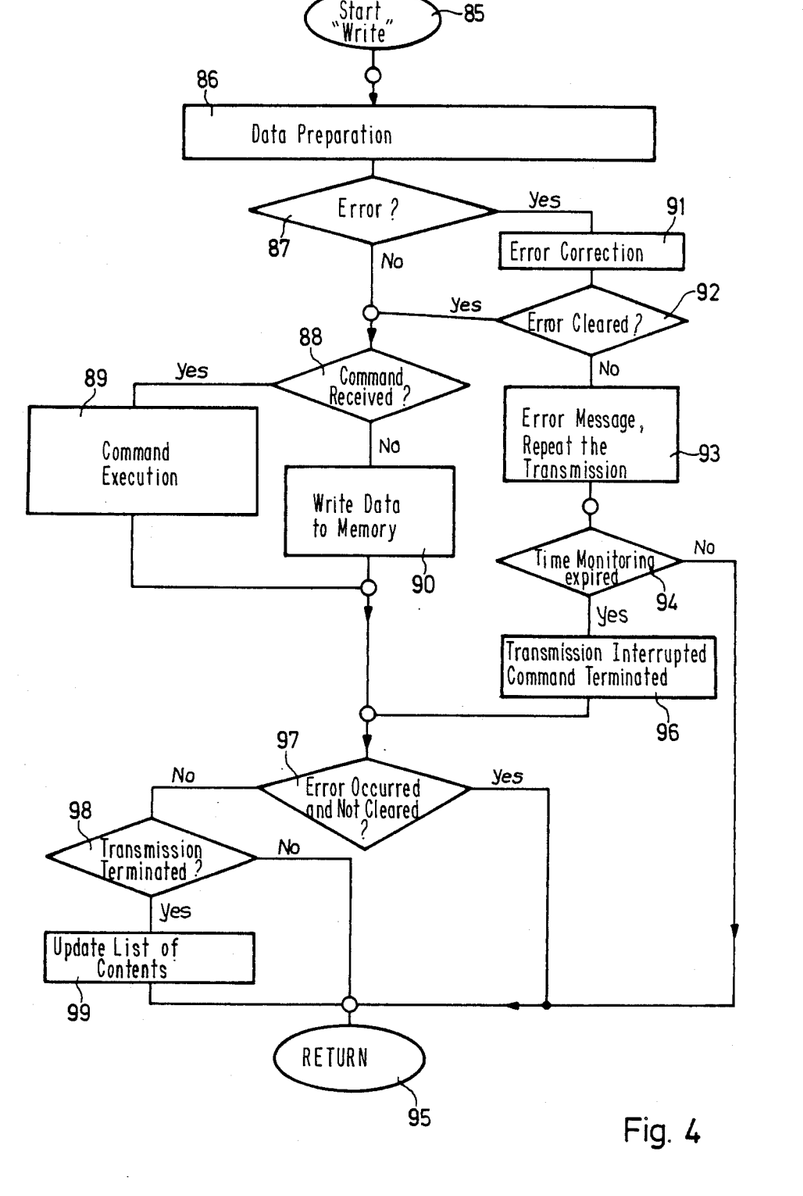
FIG. 4, is a flow diagram with the program flow for the command "Write"
Figure 5:
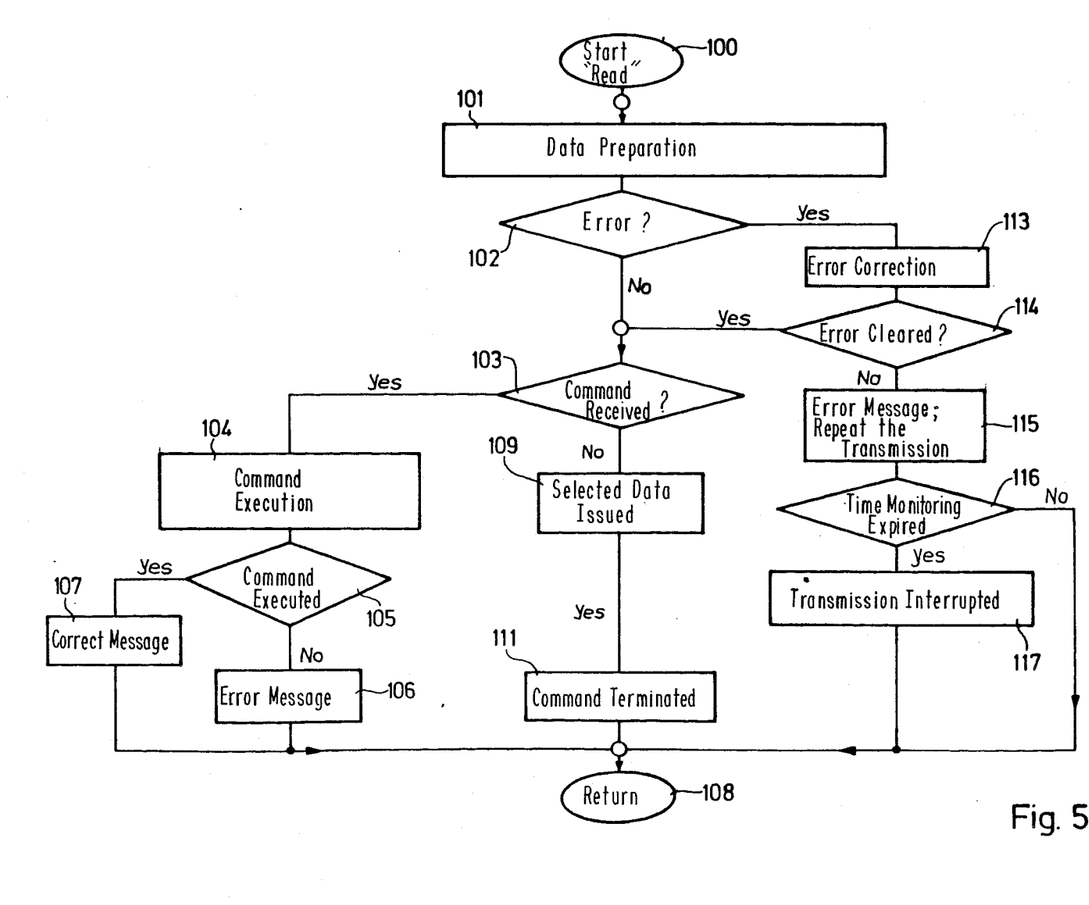
FIG. 5, is a flow diagram with the program flow for the command "Read".
Figure 6:
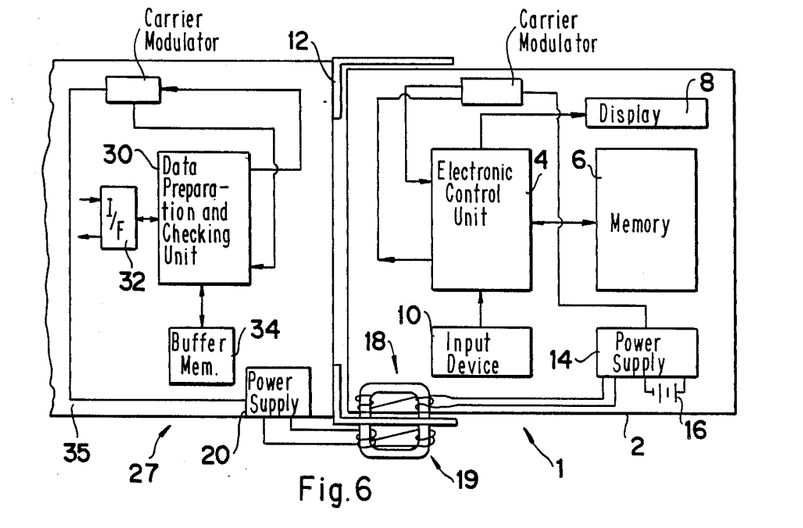
FIGS. 6–8 show alternate embodiments of FIG. 1.
Figure 7:
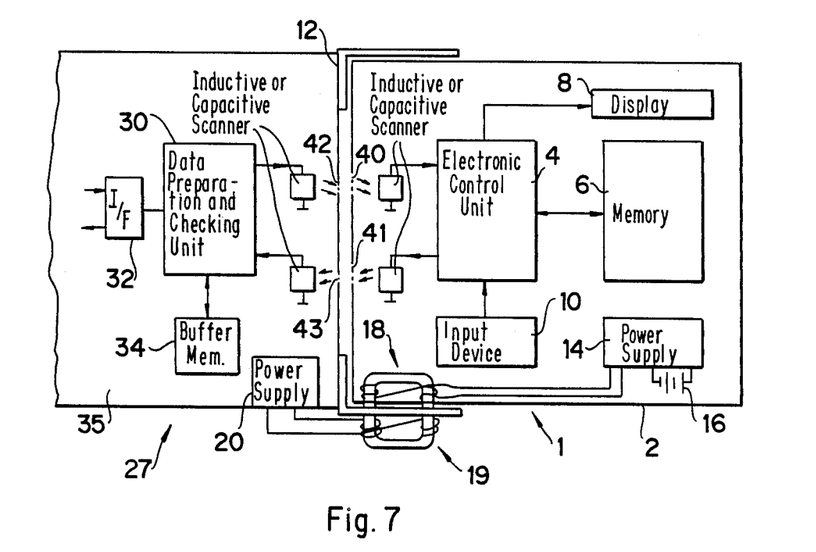
Figure 8:
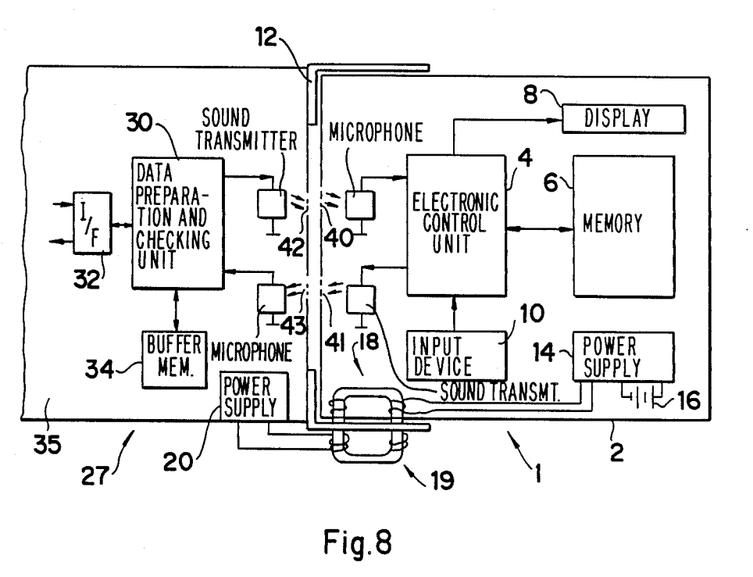

In the flow charts of FIGS. 4 and 5 the program flows of the "write" and "read" commands designated by the reference number 75 and 78 are explicitly explained as examples.

In FIG. 4, the start of the command execution "write" has the reference number 85. The data transmitted by the light transmitter 22 of the device for communication 27 with the memory 1 and received by the light receiver 21 of the data input of the memory 1 are prepared in the subsequent program step 86. This involves, for instance, paralleling the serially received data, and checking their plausibility and parity.

Negation of the next inquiry 87 regarding the detection of errors in data preparation puts the electronic control unit 4 into a waiting position for the reception of one or more possible commands 88 required for the correct execution of a write command. If such a command is registered, a subsequent program step 89 ("Command Execution") will create the prerequisites and boundary conditions required to write data in. This includes predetermining and readying the memory area needed, such as for the ink setting values of a printing order, the standardization of data according to the printing machine used, the number of ink zones, etc., the indication of the unoccupied memory space, and the lifting of the write lock, etc. The latter's purpose is to insure that stored data can be written over only by an update, i.e. updated values—but only when the same order ("job") is to be handled again later by the same machine, etc.

If, instead, no write command is received in the waiting position of the program step 88, then it follows that the values transferred by the light transmitter 22 to the light receiver 21 already involve data to be stored only, which are then entered into the memory area readied from them (program step 90).

If, instead, a data preparation error is already found immediately after the start of the program (program step 87), the proper error elimination step 92 is interrogated after error correction step 91 is completed. If the answer to this question is affirmative, a change-over to the normal program is made and the flow continues as described before.

If the data preparation error per program inquiry 92 has not been eliminated, an error message 93 is sent and a repetition of the data is transmission requested which is then timingly monitored timewise. If the requested data are given repeatedly to the time monitor 94 within a given time span, the program jumps back to its starting position via the return 95.

But if the time monitor 94 runs out without repeated transmission of the data requested, data transmission is stopped, and the write command is considered concluded (program step 96). The program steps 89, 90 and 96 jointly are followed by an error inquiry step 97 to detect errors which have occurred and not been eliminated while writing in the data. These errors may involve, for example, the lack of sufficient memory space to enter the data, the disagreement of the number of ink zones found in the program step 89 with the number of printing machine inking system values transmitted, meaning in general terms that the command 88 received could not be executed. If this is the case, i.e. if the error inquiry step 97 answers "yes", the program returns via the return 95 into its starting position 85 to run once more.

But if errors which may have occurred were corrected, an inquiry 98 is made as to whether the data transmission was concluded correctly. If this is not the case, the program again returns to its starting position 85 via the return 95. Only upon the conclusion of a correct data transmission is a "good" message sent and the index updated (program step 99). The memory unit 1 is now ready to start executing a new command.

In the program flow of the flow chart of FIG. 5, the start of the command execution "read" has the reference number 100. The further steps 101 to 104 in the program sequence correspond logically to the program steps 86 to 89 of the above-described command execution "write". Several commands must be received in the program step 103, for instance, as to how many data bytes or bits are to be transmitted, the kind of data to be transmitted (setting values for ink zones, moisture values, among others), order codes (date and name of order) etc.

The interrogator step 105 monitors the correct execution of the preceding program step 104, i.e. it checks whether the conditions required for "reading" a certain memory content have been provided, such as searching for and readying the data to be read in the memory unit 1, etc. The answer to the inquiry 105 may be negative, for instance, when the search for the memory space to be read was unsuccessful, or when a printing order of a certain date was looked for and not found, quite generally, whenever the requested data had not been entered in the memory unit 1. In that case an error message 106 is sent, and the program returns via a return 108 into a waiting position for a new command.

If the answer to inquiry 105 is "yes", a "good" message was sent, and when the program is repeated, also via the return 108, the selected data can now be transmitted (program step 109). This can be initiated, for example, by means of a value, a so-called "pseudo command", which cannot be interpreted as a command. After a predetermined time span, an inquiry is made in program step 110 as to whether the data transmission is properly concluded. If this is the case, the read "command terminated" (program step 111) overall is also concluded. The program runs via the return step 108 into the master program to a waiting position for the input of a new command.

The program steps 113 to 117 of the right flow chart branch of FIG. 5 are analogous to the program steps 91 to 96 of the flow chart of FIG. 4 in the program flow. If the transmission of the readout of a certain memory content is stopped in the program step 117, e.g. by removing the memory 1 from its seat 12, the read command is considered completed incorrectly. Here again, a repeated jump back into the starting position of the program takes place via the return 108.

It goes without saying that the invention is not restricted to the embodiment example written up in the description and depicted in the Figures and not intended to delimit the scope of the invention. Naturally, numerous structural modifications, especially the use of functionally equivalent electronic components, random combinations of the characteristics of the patent claims and of the embodiments of the invention and a multiplicity of program variations and program changes are possible.

I claim:

1. Method of storing setting value data for adjustment devices of a printing machine having a machine operator including general data used by a printing machine for controlling printing machine processes and commands, using a portable memory unit having electronically operating storage elements, a keyboard for entry of commands and data, and including at least one communication device in contactless connection with the printing machine for contactless communication with the portable memory unit and for processing information stored therein, comprising the steps of: inserting the portable memory unit into the communication device; checking automatically the portable memory unit for presence of current supply; transmitting contactlessly the setting value data, manually entering commands and data via said keyboard, checking the data for errors, correcting, by the machine operator, the data for errors, if errors are found; re-storing the corrected data in the portable memory unit; and removing the portable memory unit from the communication device for safekeeping and later use.

2. Method according to claim 1, comprising the steps of: transmitting contactlessly current supply from the communication device to the portable memory unit; and transmitting said data contactlessly superimposed upon the current supply transmission.

3. Method according to claim 1 comprising the step of checking the data stored in the portable memory unit for plausibility.

4. Method according to claim 1 comprising the step of entering commands and data via the keyboard.

5. Storage system for the storage of data for setting values including general data used by a printing machine for controlling printing machine processes and commands, comprising a portable memory unit having a plurality of electronically operating storage elements; at least one data communication device in contactless connection with the printing machine for bidirectional data communication with the portable memory unit; at least one data input in the form of at least one contactlessly working input sensor included in the portable memory unit; at least one data output in the form of at least one contactlessly scanable data output element included in the portable memory unit; a power supply unit externally feedable contactlessly via an energy carrier included in the portable memory unit; a keyboard for entry of commands and data; an electronic control unit for making logic decisions coupled to the storage elements included in the portable memory unit; the communication device serving for data communication with the portable memory unit preferably being disposed on the printing machine.

6. Storage system according to claim 5, wherein the portable memory unit and/or the communication device for communication with the portable memory unit includes a display on which stored data can be displayed numerically and/or graphically, the display including means for automatically or manually triggering the display.

7. Storage system according to claim 5, wherein the portable memory unit and/or the data communication device for communication with the memory unit includes a manual data input device.

8. Storage system according to claim 7, wherein the manual data input device includes a membrane keyboard.

9. Storage system according to claim 5, wherein said input sensor of the memory unit includes a bar code reader connected to the electronic control unit; and an associated bar code interpretation program included in the electronic control unit.

10. Storage system according to claim 5, wherein the input sensor of the portable memory unit and of the data communication device includes a data-modulated light-sensitive element.

11. Storage system according to claim 10, wherein the output element of the portable memory unit and of the data communication device includes a light emitter data-modulatingly engaging the light-sensitive element of the respective data communication device and memory unit.

12. Storage system according to claim 5, including a memory housing, and comprising means for energy radiation for generating the operating energy for the portable memory unit and the power supply having radiation-sensitive means being coupled to the energy-radiating means, said energy-radiating means being located outside the portable memory unit.

13. Storage system according to claim 12, including a memory housing, and wherein the energy-radiating means include and inductive energy radiator including a first induction coil, said portable memory unit has a housing with walls, the power supply contains a second induction coil, by means of which the operating energy can be supplied inductively between said first and second coils through the wall of the portable memory unit housing.

14. Storage system according to claim 13, wherein the second induction coil is disposed near the inside of an external wall of the memory housing.

15. Storage system according to claim 5, including a memory housing, an energy store contained in the memory housing to supply the storage elements with energy for information retention, said energy store being a battery.

16. Storage system according to claim 15, wherein said battery is a storage battery.

17. Storage system according to claim 5, including a data duplicating device for the reproduction of the stored information in the memory unit; the data duplicating device having at least one data input and at least one data output disposed opposite the respective output and input of the communication device for transfer of said data.

18. Storage system according to claim 5, including means for plausibility checking of the data stored in the portable data memory unit.

19. Storage system according to claim 5, wherein said keyboard is a diaphragm keyboard.

* * * * *